United States Patent
Kim et al.

(10) Patent No.: US 7,538,525 B2
(45) Date of Patent: May 26, 2009

(54) POWER FACTOR CORRECTION CIRCUIT

(75) Inventors: Jung-Won Kim, Seoul (KR); Dong-Hee Kim, Gyeonggi-do (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 0 days.

(21) Appl. No.: 11/232,753

(22) Filed: Sep. 21, 2005

(65) Prior Publication Data

US 2006/0061337 A1     Mar. 23, 2006

(30) Foreign Application Priority Data

Sep. 21, 2004   (KR)   ............... 10-2004-0075538

(51) Int. Cl.
G05F 1/70       (2006.01)
G05F 1/00       (2006.01)

(52) U.S. Cl. .............. 323/205; 323/222; 323/282; 363/89

(58) Field of Classification Search ........... 323/205, 323/207, 282–285, 288–290, 222, 232, 265, 323/351; 363/89, 56, 127
See application file for complete search history.

(56) References Cited

U.S. PATENT DOCUMENTS

| | | | | |
|---|---|---|---|---|
| 3,105,179 A | * | 9/1963 | Young et al. ............... 318/6 |
| 3,725,768 A | * | 4/1973 | Pelly ........................... 363/45 |
| 3,752,922 A | * | 8/1973 | Burke ......................... 375/303 |
| 3,821,620 A | * | 6/1974 | Lindberg .................... 318/799 |
| 3,912,994 A | * | 10/1975 | Stovall ........................ 388/829 |
| 4,238,723 A | * | 12/1980 | Jenks .......................... 323/322 |
| 4,301,497 A | * | 11/1981 | Johari ...................... 363/21.12 |
| 4,357,572 A | * | 11/1982 | Andersen et al. ............ 323/286 |
| 5,061,445 A | * | 10/1991 | Zoski et al. .................. 422/52 |
| 5,134,355 A | * | 7/1992 | Hastings ..................... 323/211 |
| 5,245,522 A | * | 9/1993 | Kawaguchi et al. .......... 363/37 |
| 5,502,628 A | * | 3/1996 | Arakawa ...................... 363/20 |
| 5,612,609 A | * | 3/1997 | Choi .......................... 323/210 |
| 5,757,635 A | * | 5/1998 | Seong ......................... 363/89 |
| 6,049,473 A | * | 4/2000 | Jang et al. ................... 363/89 |
| 6,069,804 A | * | 5/2000 | Ingman et al. ........... 363/21.14 |
| 6,128,205 A | | 10/2000 | Bernd et al. |

(Continued)

FOREIGN PATENT DOCUMENTS

JP        06-153496        5/1994

(Continued)

Primary Examiner—Akm E Ullah
Assistant Examiner—M'Baye Diao
(74) Attorney, Agent, or Firm—Sidley Austin LLP (57) ABSTRACT

The present invention relates to a power factor correction circuit for compensating distortion of an input current. According to the exemplary embodiment of the present invention, a turn-on interval length of a switch is controlled according to a voltage induced in a secondary winding wire of an inductor since the voltage induced in the secondary winding wire has information on an input voltage when the switch is turned on. The turn-on interval length of the switch is reduced when the input voltage is great and is increased when the input voltage is low. Therefore, distortion of the input current may be compensated by controlling the turn-on interval of the switch according to the voltage induced in the secondary winding wire without using an additional circuit for sensing the input voltage.

14 Claims, 7 Drawing Sheets

U.S. PATENT DOCUMENTS

| | | | |
|---|---|---|---|
| 6,160,385 A * | 12/2000 | Feldtkeller | 323/222 |
| 6,259,613 B1 * | 7/2001 | Lee et al. | 363/89 |
| 6,373,735 B2 * | 4/2002 | Usui | 363/89 |
| 6,429,858 B1 * | 8/2002 | Janssen et al. | 345/204 |
| 6,657,417 B1 * | 12/2003 | Hwang | 323/222 |
| 6,980,445 B2 * | 12/2005 | Fukumoto et al. | 363/45 |
| 7,035,122 B2 * | 4/2006 | Kim et al. | 363/21.18 |
| 7,242,373 B2 * | 7/2007 | Tomio et al. | 345/60 |
| 7,358,706 B2 * | 4/2008 | Lys | 323/222 |
| 2002/0140407 A1 * | 10/2002 | Hwang | 323/207 |
| 2003/0222633 A1 * | 12/2003 | Hwang | 323/282 |
| 2003/0223255 A1 * | 12/2003 | Ben-Yaakov et al. | 363/89 |

FOREIGN PATENT DOCUMENTS

| | | |
|---|---|---|
| JP | 07-131984 | 5/1995 |
| JP | 2001-286131 | 10/2001 |

* cited by examiner

(a) Vin
(b) Veao
(c) Vramp
(d) Turn-on interval of Qsw

POWER FACTOR CORRECTION CIRCUIT

CROSS-REFERENCE TO RELATED APPLICATION

This application claims priority to and the benefit of Korean Patent Application 10-2004-0075538 filed in the Korean Intellectual Property Office on Sep. 21, 2004, the entire content of which is incorporated herein by reference.

BACKGROUND OF THE INVENTION (a) Field of the Invention

The present invention relates to a power factor correction circuit, and more particularly, a power factor correction circuit for compensating distortion of an input current.

(b) Description of the Related Art

Due to current harmonic limitation standards, such as the EN61000-3-2 standard, power factor correction circuits are used in switching mode power supply (SMPS) devices. The SMPS device is used to convert an input supply voltage into direct output voltages for power supply devices typically found in, for example, mobile telephones and laptop computers. In the SMPS device, a power factor correction circuit is used for compensating power factors by controlling an input current to follow the input voltage. That is, the power factor correction circuit controls the input current to follow the external input voltage and outputs a constant direct current (DC) voltage converted from the input alternating current (AC) voltage.

The power factor correction circuit typically includes an inductor, and has various modes depending on the state of the current flowing through the inductor. For example, the current flows continuously in a continuous conduction mode, and flows discontinuously in a discontinuous conduction mode since the current flowing through the inductor reaches 0A at some point. In addition, in a critical conduction mode operating between the continuous and discontinuous conduction modes, the current flowing through the inductor is increased after it has reached 0A. The ST L6561 is a well-known power factor correction integrated circuit (IC) that operates in the critical conduction mode. Other IC power factor correction circuits include FAN7527B, TDA4862, TDA4863, MC33260, MC33262, UC3852, and SG6561.

Figure 1:
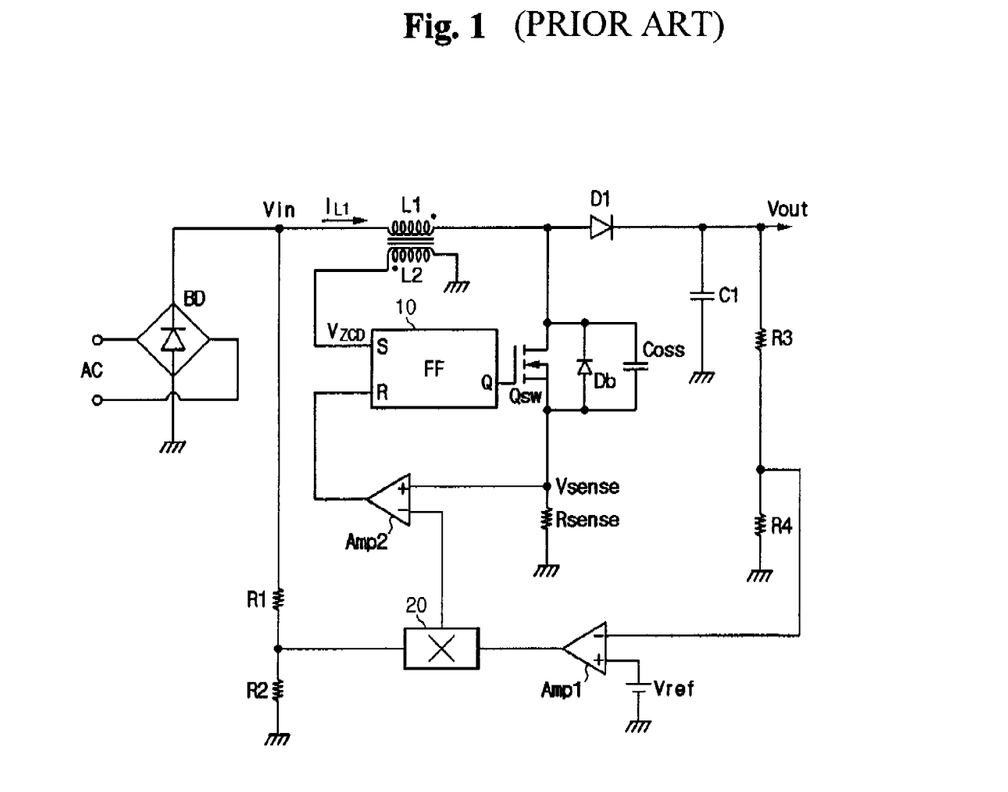
FIG. 1 is a schematic diagram of a conventional critical conduction mode power factor correction circuit.
Figure 2:
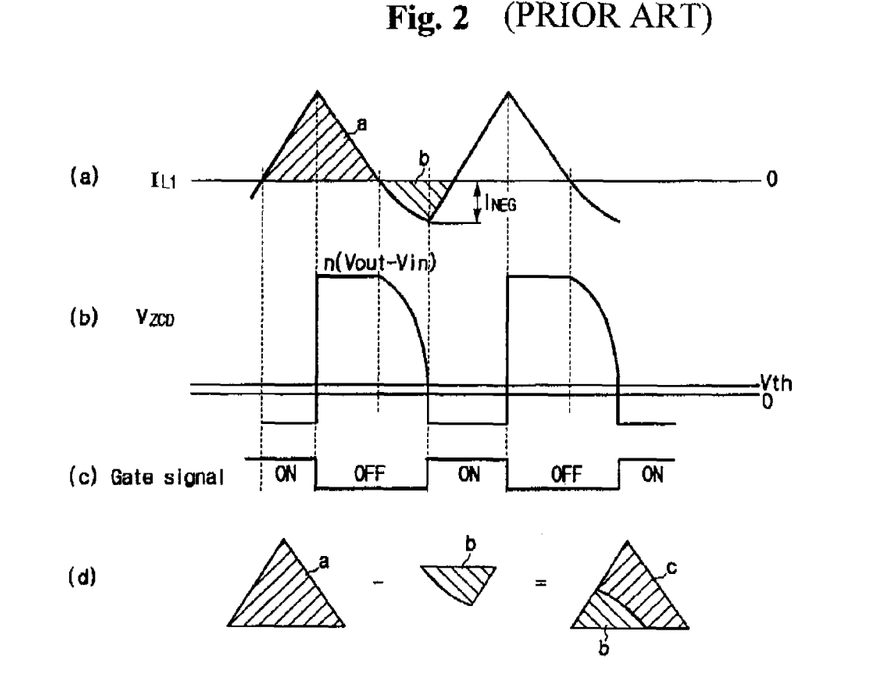
FIG. 2 is a diagram of waveforms for a current flowing through an inductor, a voltage at a secondary-side winding wire, a gate signal inputted to a switch, and an actual current in the power factor correction circuit shown in FIG. 1.
Figure 3:
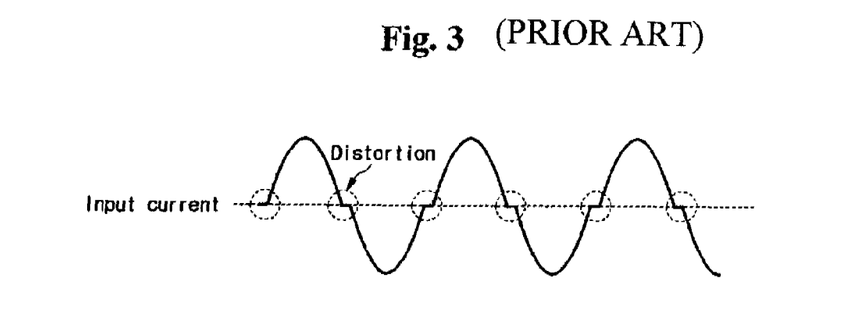
FIG. 3 is a diagram of waveforms for an input current in the conventional power factor correction circuit shown in FIG. 1.

An operation of the prior art critical conduction mode power factor correction circuit and a total harmonic distortion (THD) caused by the operation of the circuit will be described with reference to FIG. 1 to FIG. 3. FIG. 1 is a schematic diagram of a prior art critical conduction mode power factor correction circuit. FIG. 2 is a waveform diagram of a current IL1 flowing through an inductor L1, a voltage VZCD at a secondary-side winding wire L2, a gate signal input to a switch Qsw, and an actual current in the power factor correction circuit shown in FIG. 1. FIG. 3 is a waveform diagram of an input current in the prior art power factor correction circuit shown in FIG. 1.

As shown in FIG. 1, a bridge diode BD full-wave rectifies the input AC voltage, resistors R1 and R2 sense the full-wave rectified voltage, and a multiplier 20 receives it. The sensed full-wave rectified voltage input to the multiplier 20 is multiplied by the output of an amplifier Amp1, and this product is input to an inverting terminal (−) of a comparator Amp2. A current flowing through a switch Qsw is sensed by a resistor Rsense, and a sensed voltage Vsense is input to a non-inverting terminal (+) of the comparator Amp2. The comparator Amp2 compares an output of the multiplier 20 with the sensed voltage Vsense, and outputs a signal for turning off the switch Qsw when the current flowing through the switch Qsw meets a reference current output from the multiplier 20.

A reset terminal of a flip flop 10 receives the signal for turning off the switch Qsw. When the reset terminal receives the signal, the flip flop FF outputs a Low signal to an output terminal Q, and turns off the switch Qsw. The secondary-side winding wire L2 of the inductor L1 senses when a current flowing to the inductor L1 becomes 0, at which point a set terminal of the flip flop 10 is provided with a High signal. The High signal is then output to the Q output terminal, causing the switch Qsw to turn on.

As described, the input current follows the input voltage since the switch Qsw is turned on when the current flowing to the inductor L1 becomes 0, and the switch Qsw is turned off when the current flowing to the inductor L1 meets the reference current input to the inverting terminal (−) of the comparator Amp2. Accordingly, the power factor correction circuit operates in the critical conduction mode.

The input current must be in the form of a sine waveform corresponding to the input voltage to the power factor correction circuit. The sine waveform, however, is not exact since there is a delay in sensing the point when the current through the inductor L1 becomes 0 (hereinafter, the delay will be referred to as a "0 current sensing delay"). The critical conduction mode power factor correction circuit senses the point of time when the current flowing to the inductor L1 through the secondary-side winding wire L2 becomes 0, as shown in FIG. 1. FIG. 2 shows a case when there is a 0 current sensing delay in turning on the switch Qsw after the current IL1 of the inductor L1 becomes 0. Referring to FIG. 2, when the switch Qsw is turned on, the current IL1 is linearly increased, and a voltage VZCD at the secondary-side winding wire L2 becomes −n*Vin (where n denotes a transformer turns ratio). When the switch Qsw is turned off, the current IL1 is reduced with a negative slope and the voltage V ZCD becomes n*(Vout−Vin).

At this time, the switch must be turned on when the current IL1 becomes 0. However, the current IL1 has a negative value since resonance current is formed during the 0 current sensing delay between a junction capacitor Coss of a metal-oxide semiconductor field-effect transistor (MOSFET) used as the switch and the inductor L1. That is, the current IL1 has a negative value since a voltage at the capacitor Coss becomes a voltage Vout and the voltage Vout is set higher than a voltage Vin when the switch Qsw is turned off. The capacitor Coss is coupled to the switch Qsw in parallel, and a diode Db is a body diode. The switch Qsw is turned on since the High signal is input to the set terminal S of the flip flop 10 when the current IL1 is reduced to the negative current and the voltage VZCD is less than the reference voltage Vth.

As shown in FIG. 2(d), due to the negative current, a current actually flowing to the inductor L1 becomes a current c obtained by subtracting a negative current b from a desired current a. In addition, a peak value of the negative current is given in Equation 1.

$$I_{NEG} \propto \frac{Vout - Vin}{\sqrt{\dfrac{L1}{C_{oss}}}} \qquad (1)$$

where Vout denotes an output voltage, and Vin denotes a full-wave rectified input voltage. As shown in Equation 1, the peak value $I_{NEG}$ of the negative current is in proportion to a difference between the output voltage Vout and the input voltage Vin. The peak value $I_{NEG}$ of the negative current is inversely proportional to the input voltage Vin since the inductor L1, capacitor Coss, and voltage Vout have fixed values. Accordingly, the current IL1 is further reduced as the input voltage Vin decreases. That is, the peak value $I_{NEG}$ of the negative current is further increased at a point of time when the input voltage Vin becomes 0V. Accordingly, a zero crossing distortion in the input current occurs, as shown in FIG. 3. The input current shown in FIG. 3 is a current before being rectified, and is the current corresponding to the input AC voltage.

U.S. Pat. No. 6,128,205 discloses a method for decreasing the zero crossing distortion. In this patent, information on a rectified input voltage as a reference for turning off a switch is modified to increase the current IL1 flowing to the inductor L1 when the input voltage becomes 0. That is, a voltage at a resistor R2 is clamped by an additional circuit and is input to the multiplier 20 in FIG. 2. Accordingly, the zero crossing distortion is compensated by the modified and rectified input voltage. However, in this method, an additional circuit is required, including a plurality of resistors to modify the rectified input voltage, which results in both high cost and high power consumption.

The information disclosed above is only for enhancement of understanding of the background of the invention, and may contain information that does not constitute the prior art.

SUMMARY OF THE INVENTION

According to embodiments of the present invention, a power factor correction circuit without additional circuit elements such as resistors reduces distortion of an input current.

According to an embodiment of the present invention, an exemplary power factor correction circuit may include a first inductor having a first terminal coupled to an input terminal of the power factor correction circuit and a switch electrically coupled to a second terminal of the first inductor, the switch being turned on when a current flowing to the first inductor reaches zero from a positive value.

The power factor correction circuit may further include a secondary winding wire and a switching controller. The secondary winding wire is coupled to the first inductor, in which a voltage is induced by the first inductor. The switching controller receives the voltage induced in the secondary winding and a first voltage corresponding to an output voltage of an output terminal of the power factor correction circuit, and controls the duration of a turn-on interval of the switch in response to a second voltage induced in to the secondary winding wire. At this point, the duration of a turn-on interval of the switch is set to be longer if the second voltage is a smaller negative value.

According to an embodiment of the present invention, an exemplary power factor correction circuit may include a first inductor having a first terminal coupled to an input terminal of the power factor correction circuit, and a switch coupled to a second terminal of the first inductor, the switch being turned on when a current flowing to the first inductor reaches zero from a positive value. The power factor correction circuit may further include a secondary winding wire and a switching controller.

The secondary winding wire is coupled to the first inductor. A voltage induced by the first inductor is formed in the secondary winding. The switching controller receives a first voltage corresponding to an input voltage of the input terminal, the voltage induced in the secondary winding wire, and a second voltage corresponding to an output voltage of the power factor correction circuit, and controls a turn-on interval length of the switch by generating a ramp waveform voltage having a slope varying according to the first voltage when the switch is turned on. At this point, the turn-on interval length is set to be longer when the first voltage is low.

According to another embodiment of the present invention, an exemplary power factor correction circuit may include a first inductor having a first terminal coupled to an input terminal of the power factor correction circuit, and a switch electrically coupled to a second terminal of the first inductor, the switch being turned on when a current flowing to the first inductor reaches zero from a positive value.

The power factor correction circuit may further include a secondary winding wire and a switching controller. The secondary winding wire is coupled to the first inductor, in which a voltage induced by the first inductor is formed. The switching controller receives a first voltage corresponding to an input voltage of the input terminal, the voltage induced in the secondary winding wire, and a second voltage corresponding to an output voltage of an output terminal of the power factor correction circuit, and controls a turn-on interval length of the switch by delaying a first signal for turning on the switch according to the first voltage. At this point, a delay of the first signal is controlled to be longer when the first voltage is low.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE EMBODIMENTS

The embodiments of the present invention and their advantages are best understood by referring to FIGS. 4 through 10 of the drawings. Like numerals are used for like and corresponding parts of the various drawings.

Figure 4:
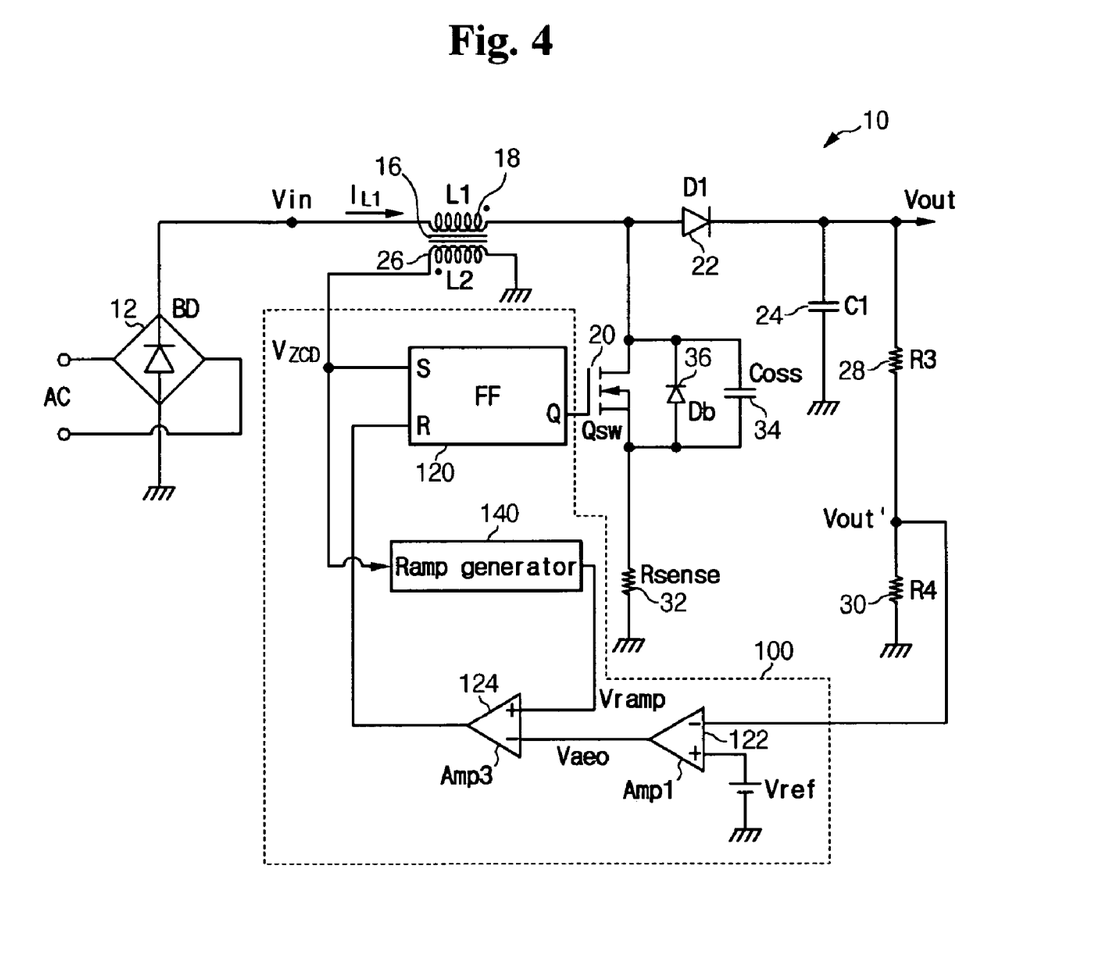
FIG. 4 is a diagram of an exemplary implementation of power factor correction circuit, according to an embodiment of the present invention.

FIG. 4 is a schematic diagram of an exemplary implementation of power factor correction circuit 10, according to an embodiment of the present invention.

As depicted, the power factor correction circuit 10 may include a bridge diode BD 12, a boost circuit 14 including a transformer 16 having a primary winding L1 18, a switch Qsw 20, a diode D1 22, a capacitor C1 24, and a switching controller 100. Hereinafter, the inductor 16, a switch Qsw 20, the diode D1 22, and the capacitor C1 24 will be referred to as "the boost circuit" for convenience of description.

The bridge diode BD 12 rectifies an externally input AC voltage and outputs a full-wave rectification voltage Vin. The switching controller 100 receives a sensed output voltage Vout' and a voltage $V_{ZCD}$ induced through a secondary-side winding L2 26 of the transformer 16, and generates a control signal for turning on/off the switch Qsw 20. A constant direct current voltage Vout is output to the capacitor C1 24 of the boost circuit 14 since the switch Qsw 20 is turned on/off by the control signal of the switching controller 100.

At this point, the exemplary power factor correction circuit 10 compensates for a distortion of the input current by establishing different turn-on intervals of the switch Qsw 20 according to the input voltage Vin since the voltage $V_{ZCD}$ becomes −n*Vin when the switch Qsw 20 is turned on, as shown in FIG. 2(b). This method of compensation is described in further detail below. The rectification voltage Vin is a full-wave rectified input AC voltage, having the same level as the input AC voltage. Therefore, the input voltage will be referred to as the full-wave rectification voltage Vin.

In addition, the exemplary power factor correction circuit 10 may further include resistors R3 28 and R4 30 for sensing the output voltage Vout, so as to perform a feedback operation of the output voltage Vout. The resistors R3 28 and R4 30 are coupled in series to each other between the output voltage Vout and a ground. The output voltage Vout' sensed at the resistor R4 is input to the switching controller 100.

In the boost circuit, a first terminal of primary winding L1 18 the transformer 16 is coupled to an output of the bridge diode BD 12, and a second terminal of the primary winding L1 18 is coupled to an anode of the diode D1 22. A cathode of the diode D1 22 is coupled to the first terminal of the capacitor C1 24, and a second terminal of the capacitor C1 24 is coupled to a ground. A drain terminal of the switch Qsw 20 is coupled to a node between the primary winding L1 18 of transformer 16 and the diode D1 22. A source terminal of the switch Qsw 20 is coupled to the ground through a resistor Rsense 32. A gate terminal of switch 20 is coupled to an output terminal of the switching controller 100.

The primary winding L1 18 of the transformer 16 is an inductor, and the secondary-side winding L2 26 is used to sense a point when the current $I_{L1}$ flowing through such inductor becomes 0. The voltage $V_{ZCD}$ is input to the switching controller 100.

In this embodiment of the present invention, since the voltage at the inductor L1 18 is Vin when the switch Qsw 20 is turned and the voltage $V_{ZCD}$ induced in secondary-side winding L2 26 according to the voltage at the primary winding L1 18 is −n*Vin, the voltage $V_{ZCD}$ is used to turn on the switch Qsw 20 and to control the turn-on interval length of the switch Qsw 20.

While an additional comparator may be coupled between the voltage $V_{ZCD}$ and the set terminal S of the flip flop FF 120 for determining a point when the voltage $V_{ZCD}$ becomes less than a reference voltage Vth, it is not shown in FIG. 4 for clarity of description. A use of such comparator is well known to those skilled in the art.

In addition, a sensing resistor Rsense 32 for sensing the current flowing through the switch Qsw 20 may be coupled between the source terminal of the switch Qsw 20 and the ground. While the switch Qsw 20 is illustrated as a MOSFET in FIG. 4, other switching devices such as a bipolar junction transistor (BJT) may be used.

A capacitor Coss 34 and a diode Db 36 coupled to the drain and source terminals of the switch Qsw 20 in parallel in FIG. 4 can be, respectively, a junction capacitance and a body diode of the MOSFET.

The switching controller 100 of the exemplary implementation of power factor correction circuit 10 may further include a flip flop 120, an amplifier Amp1 122, a comparator Amp3 124, and a ramp generator 140.

A reference voltage Vref is input to a non-inverting terminal (+) of the amplifier Amp1 122, and the sensed output voltage Vout' is input to an inverting terminal (−) thereof. The comparator Amp1 122 compares the reference voltage Vref and sensed output voltage Vout', and outputs a corresponding output voltage Vaeo. The output voltage Vaeo of the amplifier Amp1 122 has a constant value since the power factor correction circuit outputs a constant output voltage Vout. The output voltage Vaeo of the amplifier Amp1 122 is input to an inverting terminal (−) of the comparator Amp3 124, and a ramp waveform generated by a ramp generator 140 is input to a non-inverting terminal (+) thereof. The comparator Amp3 124 compares the output voltage Vaeo and the ramp waveform, and outputs a high level signal to a reset terminal R of the flip flop 120 when the ramp waveform voltage becomes the voltage Vaeo. When the high level signal High is input to the reset terminal R of the flip flop 120, the switch Qsw 20 is turned off since a Low signal is output at an output terminal Q of the flip flop 120.

At this point, the secondary-side winding L2 26 senses when the current flowing in the inductor (primary winding) L1 18 becomes 0 as described above. When the secondary-side winding L2 26 senses this point, the set terminal S of the flip flop 120 has the high level signal High, and outputs the high level signal High at the output terminal Q. Accordingly, the switch Qsw 20 is turned on.

That is, the switch Qsw 20 is turned on when the current flowing through inductor L1 18 becomes 0, and the switch Qsw 20 is turned off when the voltage Vaeo exceeds the ramp waveform voltage Vramp since the comparator Amp3 124 outputs the high level signal.

In the exemplary embodiment of the present invention, a slope of the ramp waveform voltage Vramp varies according to the input voltage Vin in order to compensate for the distortion of the input current. In particular, when the switch Qsw 20 is turned on, the ramp generator 140 receives the voltage $V_{ZCD}$ since the voltage $V_{ZCD}$ induced in the secondary-side winding L2 26 has the information on the input voltage Vin. The ramp generator 140 establishes the slope of the ramp waveform to have different slopes according to the input voltage Vin, which will be described with reference to FIG. 5 and FIG. 6.

Figure 5:
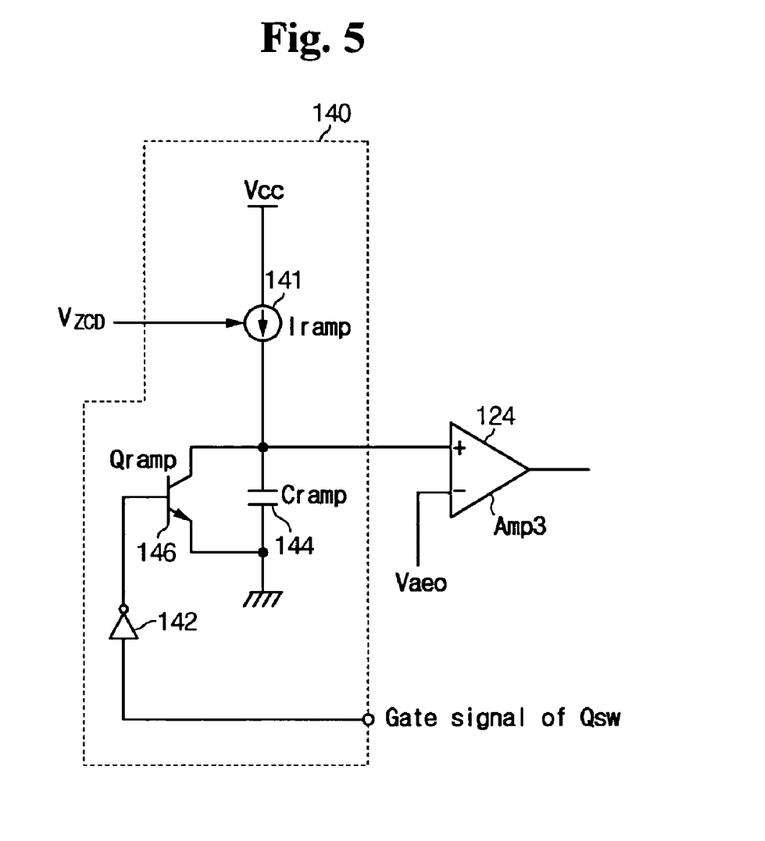
FIG. 5 is a diagram of an exemplary implementation of a ramp generator, according to an embodiment of the present invention.

FIG. 5 is a diagram of an exemplary implementation of a ramp generator, according to an embodiment of the present invention.

As shown in FIG. 5, the ramp generator 140 according to an exemplary embodiment of the present invention may include a current source Iramp 141 in which a current amount varies according to the voltage $V_{ZCD}$. Ramp generator 140 may further include a capacitor Cramp 144 coupled between the current source Iramp 141 and ground, an inverter 142 receiving a gate signal of the switch Qsw 20, and a transistor Qramp 146 having a collector terminal and an emitter terminal respectively coupled to both terminals of the capacitor Cramp 144 and a base terminal coupled to an output terminal of the inverter 142. A node between the capacitor Cramp 144 and the collector terminal of the transistor Qramp 146 forms an output terminal of the ramp generator 140, and the output terminal is coupled to the non-inverting terminal (+) of the comparator Amp3 124.

Figure 6:
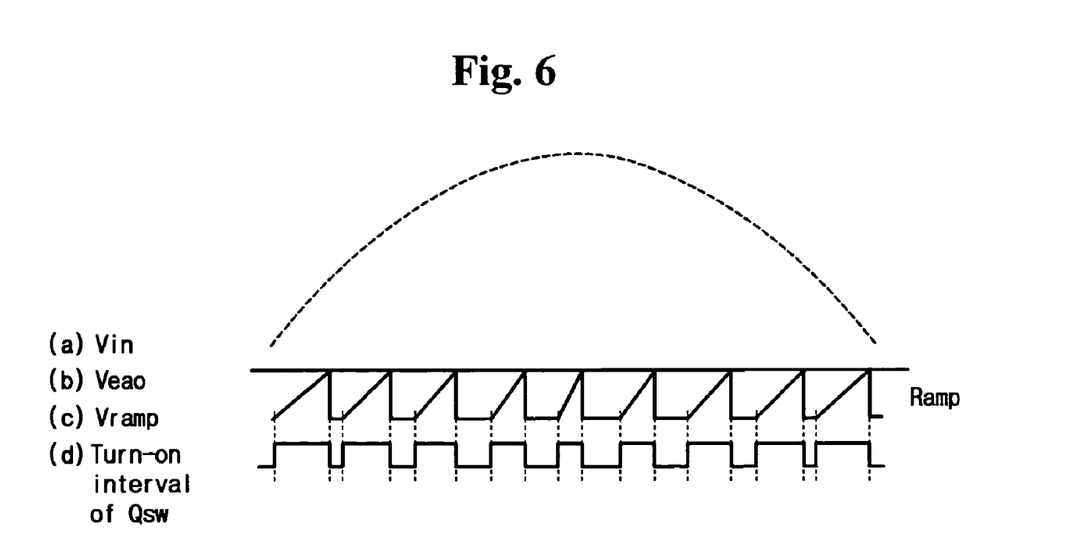
FIG. 6 is a diagram of waveforms for a ramp signal and a turn-on interval of a switch, according to an input voltage.

When the switch Qsw 20 is turned on, a ramp waveform is formed since the transistor Qramp 146 is turned off by the inverter 142, and the capacitor Cramp 144 is charged with the current of a current source Iramp 141. When the switch Qsw 20 is turned on, since the voltage $V_{ZCD}$ has the information on the input voltage Vin, the current source Iramp 141 generates a low level current when the input voltage Vin is low, and generates a higher current when the input voltage Vin is high. The slope of the ramp waveform varies according to the input voltage Vin as shown in FIG. 6 (waveforms at (a) and (c)) since a slope of a voltage charged to the capacitor Cramp 144 varies according to the current of the current source Iramp 141. In other words, the slope of the ramp waveform is steeper when the input voltage Vin is high.

When the switch Qsw 20 is turned off, the high level signal High is output at the output terminal of the inverter 142, the transistor Qramp 146 is turned on, and the voltage charge at the capacitor Cramp 144 is discharged. Therefore, the ramp waveform Vramp as shown in FIG. 6(c) is formed by the above operation.

In addition, the output voltage Vaeo of the amplifier Amp1 122 has a constant value as shown in FIG. 6(b) since the output voltage Vout has a constant value, and the comparator Amp3 124 compares the ramp waveform voltage and the voltage Vaeo, and outputs the high level signal High when the ramp waveform voltage meets the voltage Vaeo. The switch Qsw 20 is turned off by the high level signal High. The switch Qsw 20 has turn-on/off intervals as shown in FIG. 6(d). As shown in FIG. 6(d), the turn-on interval length of the switch Qsw 20 varies according to the magnitude of the input voltage Vin. That is, the turn-on interval of the switch Qsw 20 is long when the input voltage Vin is low, and it is short when the input voltage Vin is high. Accordingly, the current flowing to the inductor L1 (primary winding of transformer 16) is increased since the turn-on interval of the switch Qsw 20 is increased when the input voltage Vin is low.

As described in Equation 1, when the input voltage Vin is low, as in the first exemplary embodiment of the present invention, the current corresponding to "a" in FIG. 2(a) flowing when the switch is turned on, is further increased by increasing the length of the switch Qsw's turn-on interval. This is because the peak value INEG of the negative current is further increased when the input voltage Vin is low. Accordingly, the negative current corresponding to "b" in FIG. 2(a) generated by the 0 current sensing delay is compensated since the current $I_{L1}$ of the turned-on switch Qsw 20 is increased when the input voltage Vin is low. In other words, the distortion of the input current is compensated by varying the turn-on interval length of the switch Qsw 20 according to the input voltage Vin to compensate for the peak value INEG of the negative current.

As described, the cost and power consumption may be reduced because the information of the input voltage Vin is sensed by using the information of the voltage $V_{ZCD}$ without the need for additional circuitry such as a resistor distributor.

Another method for compensating for the distortion of the input current by varying the length of the switch Qsw's turn-on interval according to the input voltage Vin will now be described.

Figure 7:
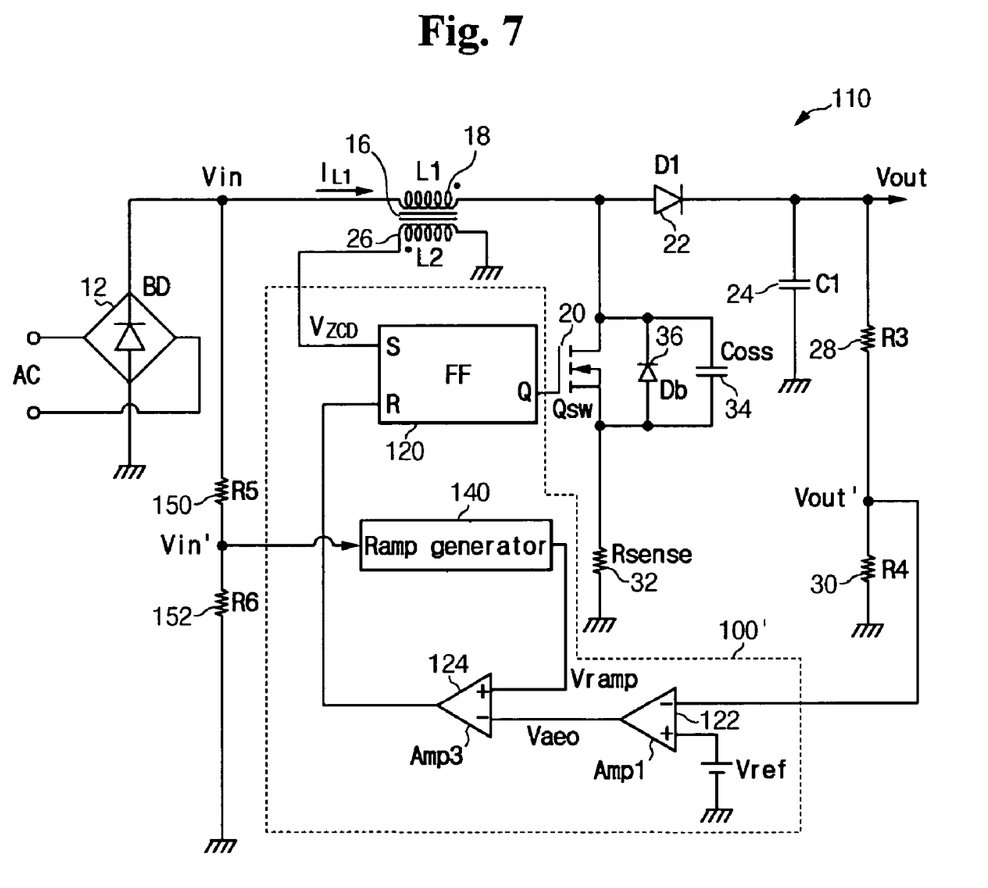
FIG. 7 is a schematic diagram of an exemplary implementation of power factor correction circuit, according to an embodiment of the present invention.

FIG. 7 is a schematic diagram of an exemplary implementation of power factor correction circuit, according to an embodiment of the present invention. As shown in FIG. 7, the power factor correction circuit 10 according to another exemplary embodiment of the present invention may further include additional resistors R5 150 and R6 152 for sensing the input voltage. This allows the slope of the ramp waveform to be varied according to the input voltage. The power factor correction circuit 110 according to this embodiment of the present invention is similar to the embodiment described with reference to FIG. 4, therefore, duplicate descriptions will be omitted.

As shown in FIG. 7, the exemplary power factor correction circuit 110 according to an embodiment of the present invention may include resistors R5 150 and R6 152, which are coupled in series and coupled between an output of a bridge diode BD 12 and a ground so as to sense the input voltage. In this embodiment, a voltage Vin' of a node between the resistors R5 150 and R6 152 is input to the ramp generator 140 of a switching controller 100'. Unlike the first exemplary embodiment of the present invention where the voltage $V_{ZCD}$ at the secondary-side winding wire L2 26 is output to the ramp generator 140, the voltage $V_{ZCD}$ is instead output to the set terminal S of the flip flop FF 120 and used for turning on the switch Qsw 20.

The ramp generator 140 varies the length of the turn-on interval of the switch Qsw 20 by varying the slope of the ramp waveform according to a voltage Vin' sensed by the resistor R5 150 and R6 152.

The slope of the ramp waveform is varied by using a voltage Vin' in the second exemplary embodiment of the present invention, since the voltage Vin' has information on the input voltage because it is a full-wave rectified voltage distributed by the resistor. Different from the first exemplary embodiment of the present invention, the input voltage is sensed by the additional resistors R5 150 and R6 152, the turn-on interval length is reduced by increasing the slope of the ramp waveform when the sensed input voltage is high, and the turn-on interval length is increased by reducing the slope of the ramp waveform when the input voltage is low.

Accordingly, variation of the peak value INEG of the negative current generated by the 0 current sensing delay according to the magnitude of the input voltage Vin is compensated by varying the turn-on interval length of the switch Qsw 20. The ramp generator 140 according to the second exemplary embodiment of the present invention is similar to the first exemplary embodiment of the present invention shown in FIG. 6, except that the current of the current source Iramp does not vary according to the voltage $V_{ZCD}$ in the ramp generator shown in FIG. 6, but instead varies according to the voltage Vin' sensed by the resistors R5 150 and R6 152.

Figure 8:
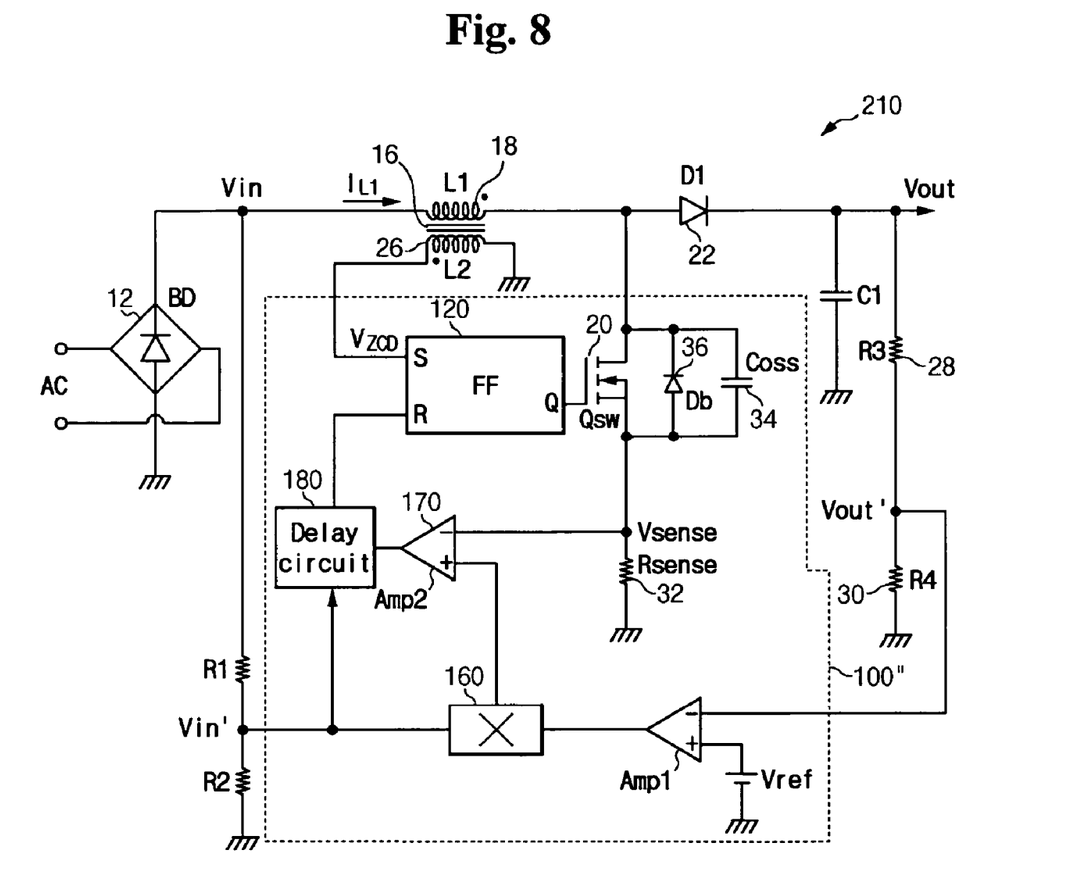
FIG. 8 is a schematic diagram of an exemplary implementation of power factor correction circuit, according to an exemplary embodiment of the present invention.
Figure 9:
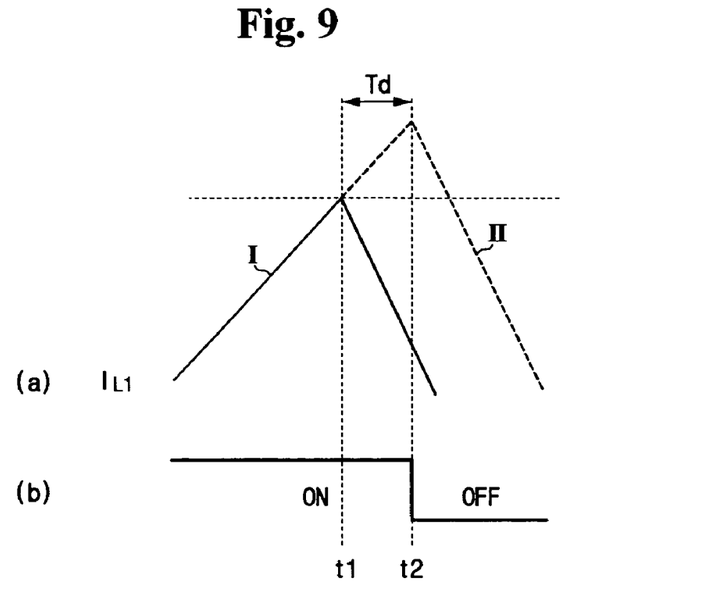
FIG. 9 is a diagram of waveforms for a current flowing to an inductor in an exemplary power factor correction circuit, according to an embodiment of the present invention.

FIG. 8 is a diagram of an exemplary power factor correction circuit 210, according to an exemplary embodiment of the present invention. FIG. 9 is a diagram of a current flowing to an inductor in an exemplary power factor correction circuit, according to an embodiment of the present invention.

As shown in FIG. 8, the power factor correction circuit 210 according to the third exemplary embodiment of the present invention is similar to the same shown in FIG. 1. The power factor correction circuit 210, however, may further include a delay circuit 180 for receiving the voltage Vin' and delaying the output of the comparator Amp2 170 according to the voltage Vin'.

As shown in FIG. 8, a switching controller 100" of the power factor correction circuit 210 according to the third exemplary embodiment of the present invention receives the input voltage Vin' sensed by the resistors R1 and R2 shown in FIG. 1, and may further include a delay circuit 180 coupled between the comparator Amp2 170 and the reset terminal R of the flip flop 120.

In addition, a flip flop 120 and a multiplier 160 shown in FIG. 8 respectively perform similar functions as the flip flop 10 and the multiplier 20 shown in FIG. 1. Other elements in FIG. 8 also perform similar functions as the elements in FIG. 1 with the same numerals. Accordingly, the power factor correction circuit 210 according to this exemplary embodiment of the present invention operates in a similar manner to the exemplary critical conduction mode power factor correction circuit 10 shown in FIG. 1. The switch Qsw 20 is turned on by voltage $V_{ZCD}$ when the current $I_{L1}$ flowing to the inductor L1 becomes 0, and the switch Qsw 20 is turned off when the voltage Vsense sensed by the resistor Rsense 32 corresponds to the reference voltage output to the multiplier 160.

The delay circuit 180 according to the third exemplary embodiment of the present invention delays a signal for turning off the switch Qsw 20 output from the comparator Amp2 170 according to the input voltage Vin'.

As shown in FIG. 9, when the delay circuit 180 is not provided, the current flowing to the inductor is similar in form to line I since the switch Qsw 20 is turned off by the signal output from the comparator Amp2 170 at point t1, but the current $I_{L1}$ flowing to the inductor L1 18 varies as line □ since the signal output from the comparator Amp2 170 is input to the reset terminal R of the flip flop 120 by the delay circuit 180 after a delay Td and the switch Qsw 20 is turned off when the delay circuit 180 is provided. According to the third exemplary embodiment of the present invention, the delay is established differently according to the magnitude of the voltage Vin' having the information on the input voltage.

That is, the current $I_{L1}$ flowing to the inductor L1 18 is increased by further increasing the delay Td when the voltage Vin' is low, and the current $I_{L1}$ flowing to the inductor L1 18 is relatively reduced by reducing the delay Td when the voltage Vin' is high. In other words, by using the delay circuit 180, the variation of the peak value INEG of the negative current generated by the 0 current sensing delay according to the magnitude of the input voltage Vin is compensated by increasing the turn-on interval length of the switch Qsw 20 by further increasing the delay Td when the input voltage Vin' is low, and is compensated by reducing the turn-on interval of the switch Qsw 20 by reducing the delay Td when the input voltage Vin' is high. An internal configuration of the delay circuit 180 is well known to those skilled in the art, and therefore detailed descriptions thereof will be omitted.

Figure 10:
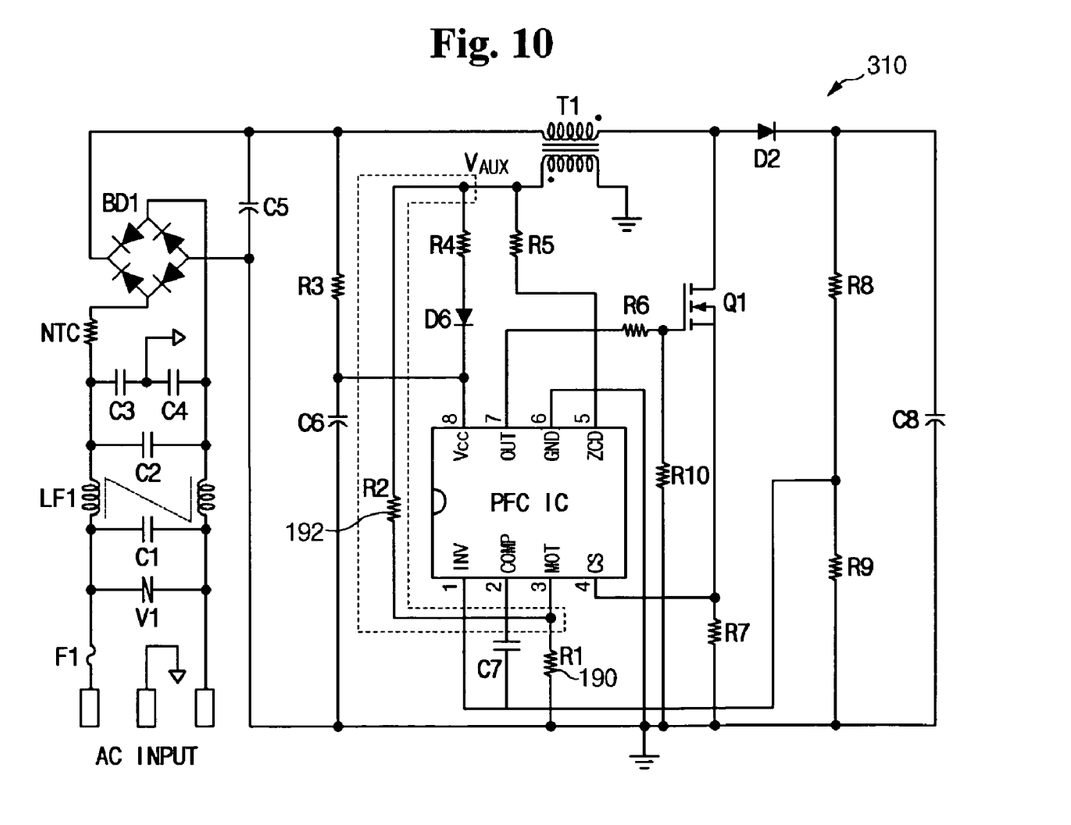
FIG. 10 is a schematic diagram of an application for an exemplary implementation of power factor correction circuit, according to an embodiment of the present invention.

FIG. 10 is a diagram of an applied example of an exemplary power factor correction circuit 310, according to an embodiment of the present invention. That is, the power factor correction circuit 10 according to the first exemplary embodiment of the present invention is modified to be realized in power factor correction circuits using an SG6561A IC. Elements shown in FIG. 10 do not correspond to elements shown in the first to third exemplary embodiments of the present invention. The elements shown in FIG. 10 are well known to those skilled in art, and therefore detailed descriptions thereof will be omitted.

The resistor R2 192 is coupled between a third terminal pin3 (i.e., MOT pin) of a PFC IC and a secondary side (corresponding to L2 26 shown in FIG. 4) of a transformer as shown in the first exemplary embodiment of the present invention. The resistor R2 192 may be realized by a combination of electrical elements. In the SG6561A IC, the third terminal pin3 (i.e., MOT pin) is used for determining a slope of an internal ramp, the slope of the ramp waveform is constant when the resistor R2 192 is not connected, and the slope is determined by the resistor R1 190.

In addition, the IC maintains a voltage of the third terminal, senses a current externally flowing from the third terminal, and charges a capacitor (not shown) so as to form the ramp waveform by an internal current mirror (not shown). When the resistor R2 192 is connected, the current flowing from the third terminal varies according to a voltage VAUX and a current caused by the resistor R1 190.

Accordingly, the slope of the ramp waveform varies according to the magnitude of the voltage VAUX (corresponding to the voltage $V_{ZCD}$ shown in FIG. 4), and the turn-on interval length of the switch Qsw 20 varies according to the input voltage (i.e., rectified input voltage) in the first exemplary embodiment of the present invention. Accordingly, the distortion of the input current may be compensated according to the first exemplary embodiment of the present invention. In addition, the resistor R1 190 may be placed in the IC in FIG. 10.

As described, the distortion of the input current may be compensated by sensing the input voltage through the voltage induced to the secondary-side winding wire of the inductor and controlling the turn-on interval length of the switch according to the sensed input voltage in the exemplary embodiment of the present invention. In addition, cost and power consumption may be reduced since the information of the input voltage is sensed without using additional circuits.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power factor correction circuit comprising:
a first primary winding of an inductor having a first terminal coupled to an input terminal of the power factor correction circuit and a switch electrically coupled to a second terminal of the first inductor, the switch being turned on when a current in the first winding reaches zero from a positive value,
a secondary winding of the inductor coupled to the primary winding, wherein a voltage is induced in the secondary winding by the current flowing in the primary winding; and
a switching controller for respectively receiving the voltage induced in the secondary winding and a second voltage proportional to an output voltage of an output terminal of the power factor correction circuit, the switching controller for controlling a duration of a turn-on interval of the switch by using a ramp waveform having a slope varying in accordance with a first voltage induced in the secondary winding when the switch is turned on.

2. The power factor correction circuit of claim 1, wherein the turn-on interval length of the switch is controlled to be longer when an absolute value of the first voltage is low.

3. The power factor correction circuit of claim 1, wherein the switching controller comprises:
- a first amplifier for comparing the second voltage and a reference voltage;
- a ramp generator for generating the ramp waveform; and
- a first comparator for comparing the ramp waveform voltage generated by the ramp generator and an output voltage of the first amplifier, and
- the switch is turned on/off when the ramp waveform voltage becomes the output voltage of the first amplifier.

4. The power factor correction circuit of claim 3, wherein the ramp generator generates a ramp waveform voltage having a slope that is greater when the absolute value of the first voltage is greater.

5. The power factor correction circuit of claim 3, wherein the ramp generator comprises;
- a current source for generating a current that varies according to the first voltage;
- an inverter for inverting on/off signals input to the switch;
- a capacitor having a first terminal coupled to the current source; and
- a transistor having first, second, and third terminals respectively coupled to the first terminal of the capacitor, the second terminal of the capacitor, and the output terminal of the inverter.

6. The power factor correction circuit of claim 1, further comprising a first resistor and a second resistor electrically coupled to each other in series between the output terminal and a ground, wherein the second voltage is a voltage at a node between the first resistor and the second resistor.

7. A power factor correction circuit comprising a first inductor having a first terminal coupled to an input terminal of the power factor correction circuit and a switch electrically coupled to a second terminal of the first inductor, the switch being turned on when a current flowing to the first inductor reaches zero from a positive value, the power factor correction circuit comprising:
- a secondary winding wire coupled to the first inductor, the secondary winding wire in which a voltage induced by the first inductor is formed; and
- a switching controller receiving a first voltage corresponding to an input voltage of the input terminal, the voltage induced in the secondary winding wire, and a second voltage proportional to an output voltage of an output terminal of the power factor correction circuit, and controlling a turn-on interval of the switch by generating a ramp waveform voltage having a slope varying according to the first voltage when the switch is turned on.

8. The power factor correction circuit of claim 7, wherein the turn-on interval length is set to be longer when the first voltage is low.

9. The power factor correction circuit of claim 7, wherein the switching controller comprises:
- a first amplifier for comparing the second voltage and a reference voltage;
- a ramp generator for generating the ramp waveform voltage having a slope varying according to the first voltage; and
- a first comparator for comparing the ramp waveform voltage generated by the ramp generator and an output voltage of the first amplifier, and
- the switch is controlled to be turned on/off when the ramp waveform voltage becomes the output voltage of the first comparator.

10. The power factor correction circuit of claim 9, further comprising first and second resistors electrically coupled to each other in series between the input terminal and a ground, wherein the first voltage is a voltage at a node between the first resistor and the second resistor.

11. A power factor correction circuit comprising a first inductor having a first terminal coupled to an input terminal of the power factor correction circuit and a switch electrically coupled to a second terminal of the first inductor, the switch being turned on when a current flowing to the first inductor reaches zero from a positive value, the power factor correction circuit comprising:
- a secondary winding wire coupled to the first inductor, the secondary winding wire in which a voltage induced by the first inductor is formed; and
- a switching controller receiving a first voltage proportional to an input voltage of the input terminal, the voltage induced in the secondary winding wire, and a second voltage proportional to an output voltage of an output terminal of the power factor correction circuit, and controlling a turn-on interval length of the switch by delaying a first signal for turning on the switch according to the first voltage.

12. The power factor correction circuit of claim 11, wherein a delay of the first signal is set to be longer in a case that the first voltage is low.

13. The power factor correction circuit of claim 11, wherein the switching controller comprises:
- a first amplifier for comparing the second voltage and a reference voltage;
- a multiplier for multiplying the first voltage by an output of the first comparator;
- a second comparator for comparing a third voltage corresponding to a current flowing through the switch and an output voltage of the multiplier, and output the first signal when the third voltage becomes the output voltage of the multiplier; and
- a delay circuit for delaying the first signal according to the first voltage.

14. The power factor correction circuit of claim 13, further comprising first and second resistors electrically coupled to each other in series between the input terminal and a ground, wherein the first voltage is a voltage at a node between the first resistor and the second resistor.

* * * * *